United States Patent
Hegar et al.

(10) Patent No.: US 10,958,987 B1
(45) Date of Patent: Mar. 23, 2021

(54) MATCHING BASED ON VIDEO DATA

(71) Applicant: Amazon Technologies, Inc., Seattle, WA (US)

(72) Inventors: Ryan Paul Hegar, Happy Valley, OR (US); John Robert Saxton, Portland, OR (US); Brian Lewis, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 15/968,689

(22) Filed: May 1, 2018

(51) Int. Cl.
| | |
|---|---|
| *G06K 9/00* | (2006.01) |
| *H04N 21/8358* | (2011.01) |
| *G06T 1/00* | (2006.01) |
| *G06K 9/62* | (2006.01) |

(52) U.S. Cl.
CPC ..... *H04N 21/8358* (2013.01); *G06K 9/00758* (2013.01); *G06K 9/6202* (2013.01); *G06T 1/0021* (2013.01); *G06T 2201/0065* (2013.01)

(58) Field of Classification Search
CPC ........... H04N 21/8358; G06K 9/00758; G06K 9/6202; G06T 1/0021; G06T 2201/0065
See application file for complete search history.

(56) References Cited

U.S. PATENT DOCUMENTS

| | | | |
|---|---|---|---|
| 5,647,049 A | 7/1997 | Odaka | |
| 5,715,009 A | 2/1998 | Tahara | |
| 5,805,225 A | 9/1998 | Tahara | |
| 6,125,143 A | 9/2000 | Suzuki | |
| 6,724,821 B1 | 4/2004 | Sawada | |
| 6,920,177 B2 | 7/2005 | Orchard | |
| 8,422,546 B2 | 4/2013 | Lin | |
| 9,113,164 B1 | 8/2015 | Gu | |
| 9,126,274 B2 | 9/2015 | Firth | |
| 9,137,528 B1 | 9/2015 | Wu | |
| 9,167,274 B1 | 10/2015 | Gu | |
| 9,237,343 B2 | 1/2016 | Cohen | |
| 9,313,248 B2 | 4/2016 | Epstein | |
| 9,491,498 B2 | 11/2016 | Brooks | |
| 10,630,748 B1 | 4/2020 | Hegar et al. | |
| 10,630,990 B1 | 4/2020 | Saxton et al. | |
| 2003/0138047 A1 | 7/2003 | Orchard | |
| 2005/0078754 A1 | 4/2005 | Liang | |
| 2006/0268990 A1 | 11/2006 | Lin | |
| 2007/0019874 A1 | 1/2007 | Sethuraman | |
| 2007/0081588 A1 | 4/2007 | Raveendran | |
| 2007/0165718 A1 | 7/2007 | Okazaki | |
| 2007/0223582 A1 | 9/2007 | Borer | |
| 2008/0207182 A1 | 8/2008 | Maharajh | |

(Continued)

OTHER PUBLICATIONS

Davis et al., Efficient Delivery within the MPEG-21 Framework, 2005.

*Primary Examiner* — Xin Jia
(74) *Attorney, Agent, or Firm* — Knobbe, Martens, Olson & Bear, LLP

(57) ABSTRACT

A content stream matching and processing process is provided. A computing device receives a plurality of content streams. The computing device processes the content streams to generate picture data information. The picture data information can be utilized to determine whether the content streams can be aligned. Based on the alignment, the computing device can characterize the similarity of the content streams.

12 Claims, 9 Drawing Sheets

(56) References Cited

U.S. PATENT DOCUMENTS

| | | |
|---|---|---|
| 2009/0040303 A1 | 2/2009 | Finn |
| 2010/0020886 A1 | 1/2010 | Raveendran |
| 2010/0104256 A1* | 4/2010 | Tsurumi ............. G06K 9/00335 386/241 |
| 2010/0295868 A1* | 11/2010 | Zahnert ................. H04N 1/107 345/634 |
| 2011/0225417 A1 | 9/2011 | Maharajh |
| 2012/0272285 A1 | 10/2012 | Brooks |
| 2012/0321001 A1 | 12/2012 | Raveendran |
| 2013/0039412 A1 | 2/2013 | Narroschke |
| 2013/0064527 A1 | 3/2013 | Maharajh |
| 2013/0114744 A1 | 5/2013 | Mutton |
| 2013/0166580 A1 | 6/2013 | Maharajh |
| 2014/0169451 A1 | 6/2014 | Cohen |
| 2014/0328384 A1 | 11/2014 | Novotny |
| 2015/0092106 A1* | 4/2015 | Savare .................... H04N 5/04 348/512 |
| 2015/0249828 A1 | 9/2015 | Rosewarne |
| 2015/0296224 A1 | 10/2015 | Davis |
| 2015/0312601 A1 | 10/2015 | Novotny |
| 2015/0381961 A1 | 12/2015 | He |
| 2016/0360206 A1 | 12/2016 | Wu |
| 2017/0205977 A1* | 7/2017 | Fertik ................ G06F 3/04842 |
| 2017/0331914 A1 | 11/2017 | Loach |
| 2017/0344843 A1* | 11/2017 | Wang ............... H04N 21/2353 |
| 2017/0359590 A1 | 12/2017 | Zhang |
| 2019/0110096 A1* | 4/2019 | Shaw ............... H04N 21/25866 |
| 2020/0213592 A1 | 7/2020 | Saxton et al. |

* cited by examiner

US 10,958,987 B1

MATCHING BASED ON VIDEO DATA

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Some content providers attempt to facilitate the delivery of requested content through the utilization of a content delivery network ("CDN") service provider. As with content providers, CDN service providers also provide requested content to client computing devices often with consideration of image quality of the requested content to the client computing device. Accordingly, CDN service providers often consider image quality as part of the delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
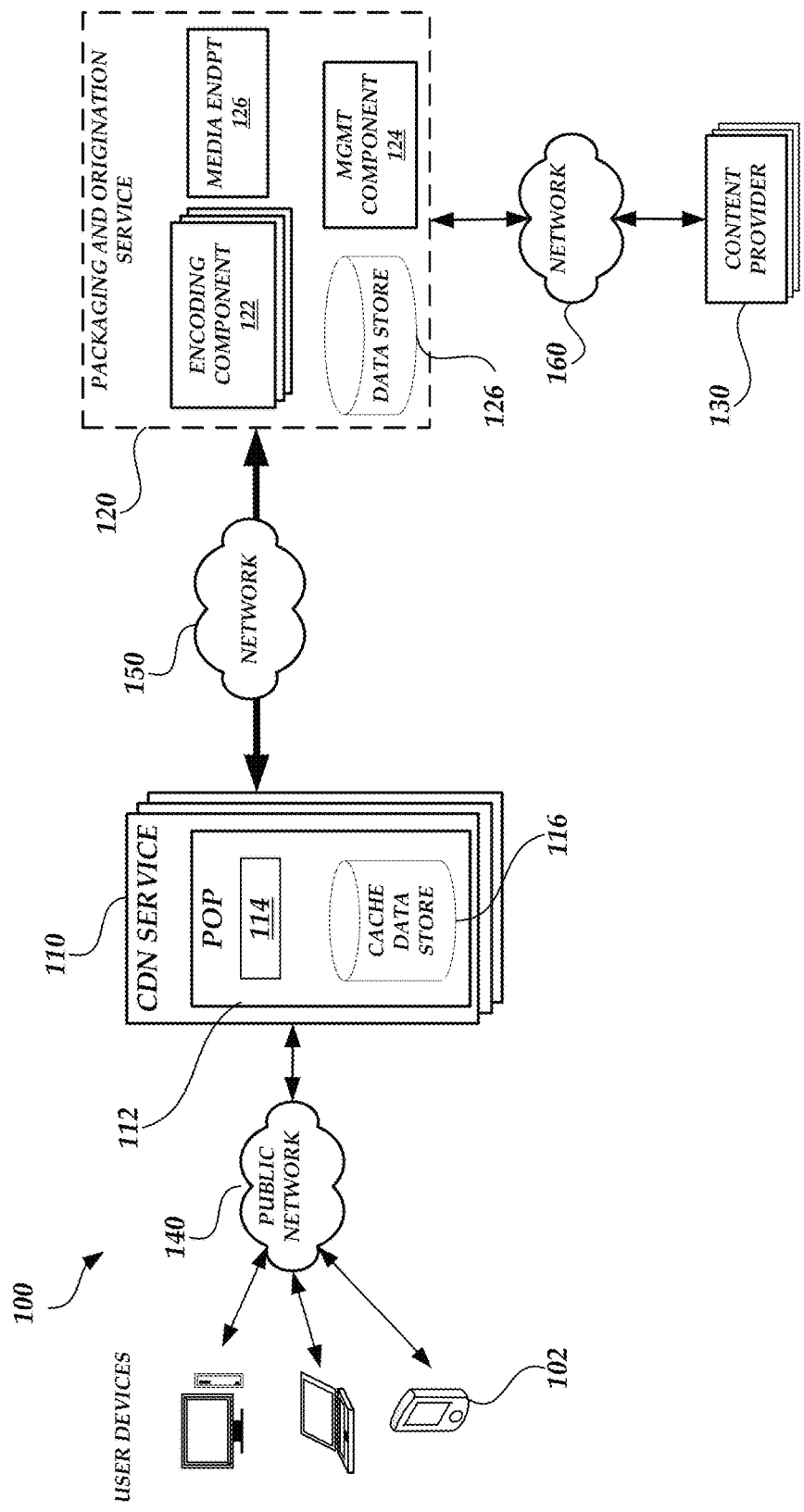
FIG. 1 is a block diagram of a content delivery environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can distribute the computing devices, such as encoding components, among areas, generally referred to as availability zones. Such different areas can be defined according to geological or logical criteria. As applied to encoding content, a video packaging and origination service can set up of groups of encoding components according to different availability zones. Still further, a video packaging and origination service can configure one or more encoder components from different availability zones such that two or more encoder components can redundantly provide encoded content segments to a destination, such as a media endpoint (e.g., storage location) or a media playing application.

While a single computing device might be used to process a content stream, any failure or delay by that computing device might cause a corresponding failure or delay in the content stream. Moreover, because of the "streaming" nature of some content, it may not be possible to recover a portion of the content that is lost due to delay or failure. For example, where a computing device processing a content stream fails and must reboot, the portion of the content stream (e.g., stemming from a live recording) may simply be lost to end viewers.

In the instance that a single encoder device fails, other devices can continue to process the content stream, with the intention that end users experience an uninterrupted stream. However, despite concurrent processing of content, redundant devices may not be fully interchangeable, such that transitioning an end user between streams provided by redundant devices does not result in a "seamless" transition. Specifically, the content output by any processing device may be dependent at least in part on the state of that device.

Typically, to achieve synchronized, redundant content streams, respective content encoder components can receive timing information that can be utilized to align the output of the redundant content stream. Timing information can generally include a current "timestamp" for content processed by the device, the arrangement of "segments" within the content, or other variables. After synchronization, each content processing device can begin processing content according to the synchronized state, such that an output content stream is interchangeable with the content streams provided by other devices. In some situations, however, timing information may not readily be available. For example, if encoding components have different input sources timing information provided by respective input sources may be incompatible for purposes of synchronization. In other example, the respective input sources may be associated with different encoding parameters, such as bitrate and format, that may make traditional timing information synchronization inefficient or impossible.

In still other aspects not necessarily related to redundant content streaming, content providers generating the original content streams or other service providers can require some form of comparison of content streams to make a determination of similarity between the content streams. For example, a content provider can utilize watermarking or digital fingerprinting for content streamed to user devices that requires content stream matching to attempt to match content streams. More specifically, in situations in which content is redistributed without authorization from a content provider by a customer (or in a manner not allowed by the content provider), content providers typically require some form of information included in the content streams that facilitates the identification of a possible source of such redistribution by attempting to match a distributed content stream with an original content.

One approach to including digital watermarking in streamed content corresponds to modification of the content prior to encoding. More specifically, a video packaging and origination service can utilize a service that receives video content to be encoded, modifies the video content in some manner, and returns the modified content for encoding. For example, a video packaging and origination service can interface with a third-party service or library that modifies a portion of the video pixel data by inserting information or altering the appearance of the content. The third-party service returns the modified content for encoding by the video packaging and origination service. Although such approaches can facilitate some form of watermarking, modification of the content prior to encoding and detailed image analysis can result in additional financial cost and resource consumption.

Aspects of the present application correspond to a content streaming system and methodology for managing encoder components. More specifically, in an illustrative embodiment, a video packaging and origination service can include two or more encoder components that receive content for encoding and transmitting to requesting entities. Illustratively, the content can be provided by a content provider, which configures the video packaging and origination service to encode one or more content streams in response to requests for the content streams. Individual encoder components receive or access content, encode the content according to one or more encoding profiles defined by an encoding bitrate and format, and make the encoded content streams available for transmission. The encoder components may receive inputs from a common source or from different sources.

Upon receipt of the content to be encoded, individual encoder components can generate or determine picture data information associated with determining differences between individual images in the sequence of images forming the content to be encoded. By way of non-limiting examples, the encoder components can divide individual images according to blocks of pixels in which each pixel block is associated with a logical location defined along a horizontal and vertical axis (e.g., a location defined by a x and y axis). The picture data can be representative of the calculated difference between the attributes representative of pixel block in successive images or frames of the content to be encoded. For example, the picture data can be representative of differences in lumen property or brightness in successive images. The differences can be illustratively determined in a value defined according to a mean average error, mean square error, or combination thereof based on a comparison of one or more attributes within the pixel block.

The encoder components, utilizing a picture data processing routine, can select one or more blocks as representative of the differences in sequence of images. For example, the encoder component can select a single pixel block having the highest calculated difference, at least a subset of pixel blocks exceeding a threshold difference amount, a fixed number of pixel blocks prioritized according to calculated difference and the like. The individual encoder components then store calculated picture data information and then transmit picture data information to other encoder component associated with a particular redundant transmission (e.g., two or more encoder components).

Based on the exchange of picture data information, individual encoder components associated with a redundant transmission then process the picture data to determine an alignment for synchronized transmission and processing of encoded data. More specifically, the picture data can generally represent a pattern in the sequence of images forming the content to be encoded. The picture data does not require or rely on a detailed image analysis of any particular image in the sequence. Accordingly, by identifying the greatest amount of differences between frames, the individual encoder components can utilize a sliding window that attempts to align the sequence of identified differences. For example, the encoder components can create a sliding window in which the smallest difference or error between the sequence patterns is indicative of a best alignment. The difference/error can be calculated as window error in the form of a mean average error or mean squared error. Based on the determined alignment, individual encoders can utilize the determined alignment to modify the encoding process to attempt output locking, transmit the alignment, such as in synchronization information, to allow destinations, such as a packager, storage location, etc. to process redundant encoded content streams. The process of exchanging picture data and determining alignment can continue throughout the streaming process, and can assist in case encoder components experience errors or latencies or the content sources inject latencies in transmitting content, as well other issues.

Aspects of the present application correspond to a computing device for utilizing video data to characterize whether two or more content streams can be considered to match. More specifically, in an illustrative embodiment, a service provider or component, such as a management component in a video packaging and origination service or a stand-alone computing device, receives two or more content streams and attempts to characterize whether the received content streams can be characterized as similar or matching based on whether picture data associated with the content streams can be aligned.

Upon receipt of the content data, the computing device generates, determines, or has otherwise received picture data information associated with determining differences between individual images in the sequence of images forming the content to be encoded. As described above, by way of non-limiting examples, the computing device can divide individual images according to blocks of pixels in which each pixel block is associated with a logical location defined along a horizontal and vertical axis (e.g., a location defined by a x and y axis). The picture data can be representative of the calculated difference between attributes of a pixel block in successive images or frames of the content to be encoded. The differences can be illustratively determined in a value defined according to a mean average error, mean square error, or combination thereof, based on a comparison of one or more pixel attributes within the pixel block.

Additionally, in the context of security application in which watermarking images or distortions are incorporated in specific locations in images, one of the inputted content streams can correspond to an "original content stream" with the watermarking information. Accordingly, the picture data can be focused on pixel blocks that would likely include the watermarking information. The computing device can select one or more blocks as representative of the differences in sequence of images. For example, the computing device can select a single pixel block having the highest calculated difference, at least a subset of pixel blocks exceeding a threshold difference amount, a fixed number of pixel blocks prioritized according to calculated difference and the like. In other embodiments in which the selected pixel block is intended to have a watermarking or security image, the computing device can select a single pixel block having the least amount difference with a reference content stream.

Based on the determined set picture data information for the inputted content streams, the computing device processes the picture data to determine an alignment for the content streams. As described above, the picture data can generally represent a pattern in the sequence of images forming the content to be encoded. The picture data does not require or rely on a detailed image analysis of any particular image in the sequence. Accordingly, by identifying the greatest amount of differences between frames, the individual encoder components can utilize a sliding window that attempts to align the sequence of identified differences. For example, the encoder components can create a sliding window in which the smallest difference or error between the sequence patterns is indicative of a best alignment. The difference/error can be calculated as window error in the form of a mean average error or mean squared error. Based on confidence values associated with the identified "best" alignment, the computing device can then characterize a match between content streams in the form of binary representations (e.g., "yes" or "no") or in a degree of matching based on a confidence value. Such applications of picture data can facilitate the identification of watermarking information in content streams or other applications in which content stream matching is required or applicable.

In accordance with one or more aspects of the present application, the video packaging and origination service can continue to leverage the benefit of redundantly configured encoder components. However, the video packaging and origination service can minimize the need for embedded time information or supplement time information to process and synchronize redundant content streams. Additionally, based on other aspects of the present application, the video packaging and origination service or other component can further utilize picture data to attempt to match two or more content streams by determining possible alignments of the content streams and generating a confidence value that an identified alignment is indicative of a potential match. Accordingly, picture data can be utilized for various processes, such as security detection, to mitigate more computationally expensive process that relate to more detailed image analysis.

FIG. 1 illustrates a general content delivery environment 100 for delivering content from original content providers to user devices. The content delivery environment 100 includes a plurality of devices 102 utilized by individual users, generally referred to as user computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more processing components 114 for processing information for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The content delivery environment 100 can include a plurality of content providers 130 for delivering input signals to the video packaging and origination service 120. The content providers may include one or more servers for delivering content, a data store for maintaining content and a communication manager for facilitating communications to the video packaging and origination service 120 over network° 160. In other embodiments, the content provider 130 can further user devices 120 that are generating live video feeds for transmission by the video packaging and origination service 120. As will be described in detail below, illustratively, the content provider 130 can include or provide multiple, distinct input signals to the video packaging and origination service 120.

In accordance with embodiments, the video packaging and origination service 120 includes a set of encoding components 122 for receiving content provided by the content providers 130 (or other source) and processing the content to generate a set of encoded video segments available for delivery. The video packaging and origination service 120 can further include a data store 126 for maintaining collected content streaming information, update information, or configuration information. The video packaging and origination service 120 is further optionally associated with a management component 124 to facilitate the determination of matching content streams or alignment data. The management component 124 can delegate at least some portion of the identified functionality to the encoder components themselves, such as the determination or negotiation of the handover or stop events.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one or more virtual machines implemented in a hosted computing environment. A hosted computing environment may include one or more rapidly provisioned and released computing resources, which computing resources may include computing, networking or storage devices.

Figure 2:
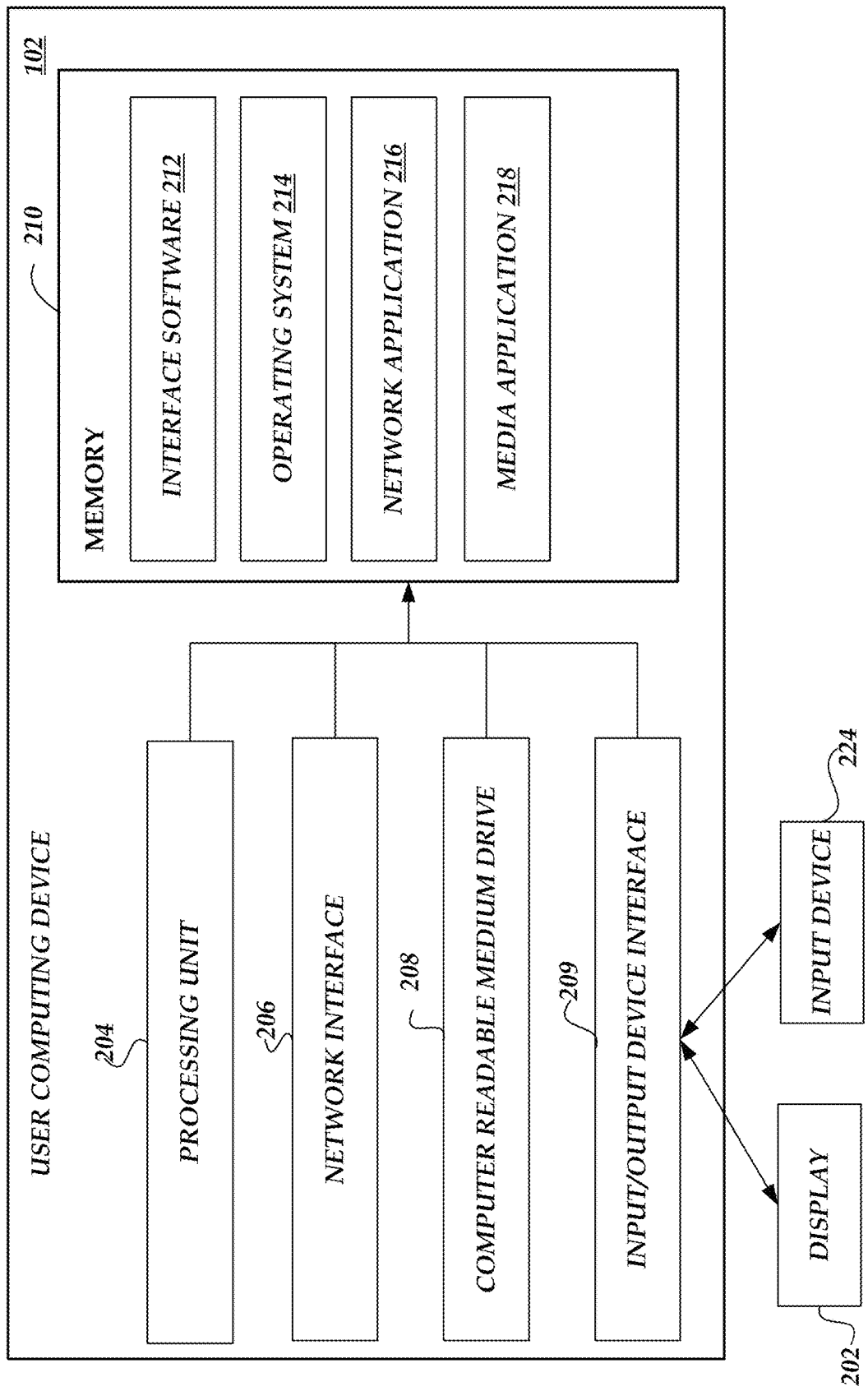
FIG. 2 is a block diagram of illustrative of components of a client computing device configured to remotely process content in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider 110. In another example, in one embodiment, the memory 210 includes a specific media player application for accessing content, decoding the encoded content, and communicating with the CDN service provider 110.

Figure 3:
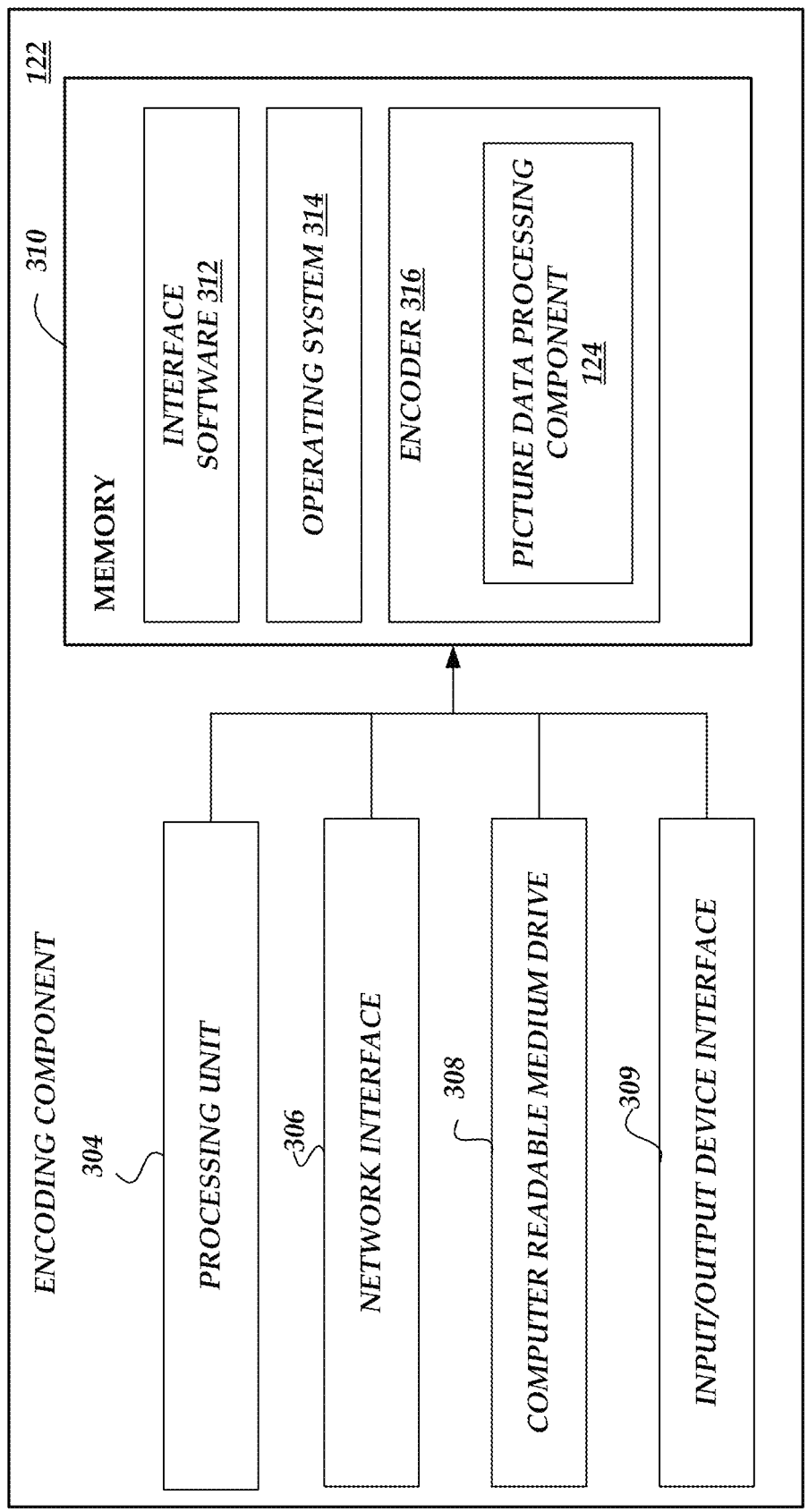
FIG. 3 is a block diagram of illustrative of components of an encoder of a packaging and origination service configured to manage content encoding by synchronizing according to exchanged picture data in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests.

As will be described in detail below, the encoder 316 includes a picture data processing component 318 for managing the interactions between encoder components to exchange picture data. Additionally, the picture data processing component 318 can facilitate determinations regarding possible alignment of encoded output streams with redundant, peer encoder components or the transmission of the alignment data to a destination, such as a packer component to allow for processing of redundant encoded content streams. Illustratively, each individual encoder component can correspond to the architecture illustrated in FIG. 3. Accordingly, the exchange and processing of picture data between the peer encoded components can attempt to have individual encoder components 122 make adjustments.

As specified above, in one embodiment, the encoder components 122 illustrated in FIG. 3 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 4:
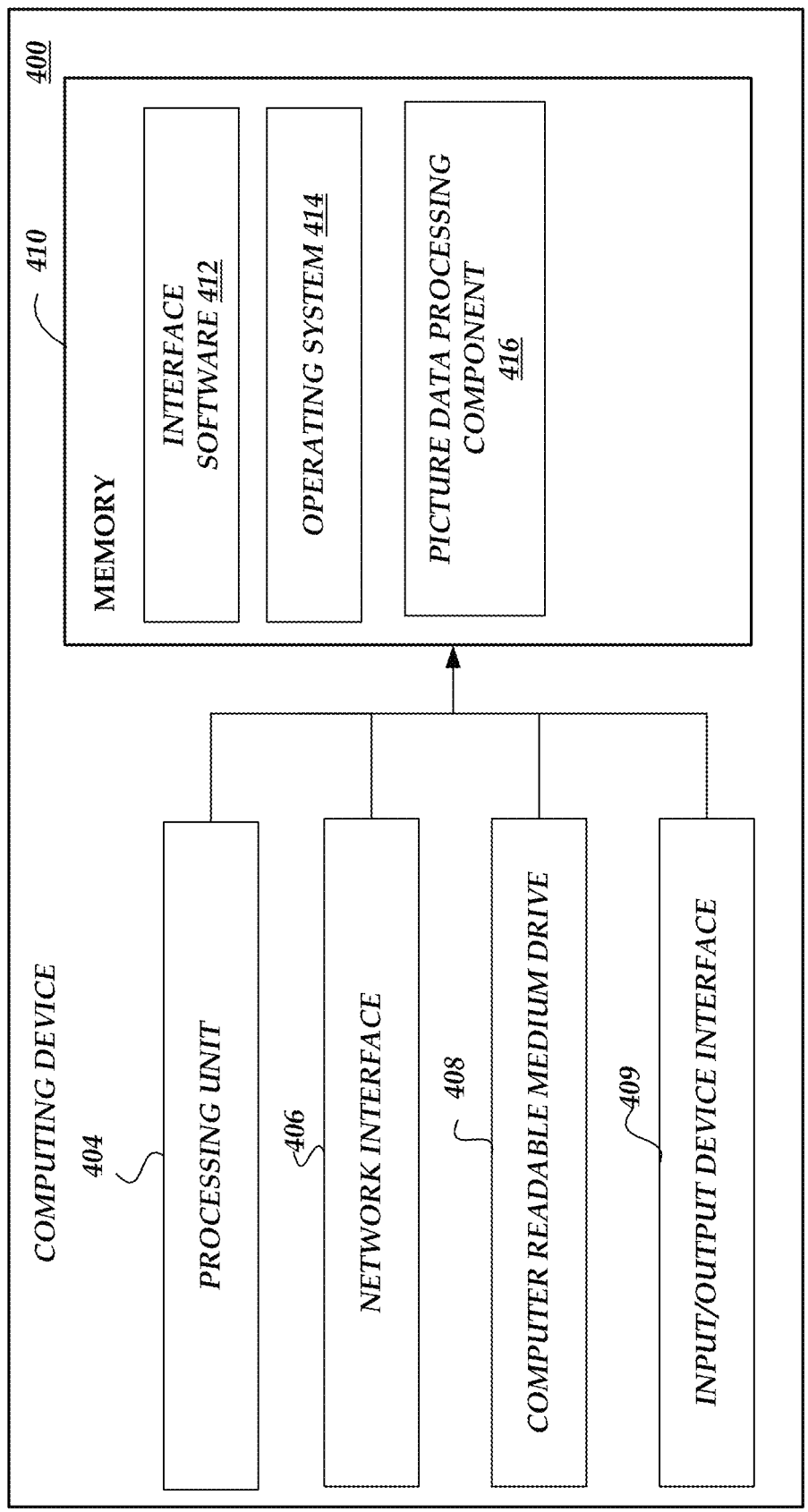
FIG. 4 is a block diagram illustrative of components of a computing device for utilizing in using picture data to process multiple content streams in accordance with some embodiments.

FIG. 4 depicts one embodiment of an architecture of an illustrative computing device 400 for implementing a picture data processing routine described herein. The computing device 400 can be a part of the video packaging and origination service 120 and incorporated as part of the generation of alignment information for a plurality of encoder component 122, such as part of the management component 124. Alternatively, the computing device 400 may a stand-alone device independent of the video packaging and origination service 120 or as part of a service/service provider also independent of the video packaging and origination service 120. The computing device 400 can implement the processed described herein for purposes of facilitating encoder alignment, characterizing similarity of content streams, and the like.

The general architecture of the computing device 400 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 400. The memory 410 may further include computer program instructions and other information for implementing aspects of the present disclosure. For example, in one embodiment, the memory 410 includes interface software 412 for receiving and processing content streams. Memory 410 includes a video data processing component 416 for managing the interactions between encoder components and making determinations regarding possible alignment of encoded output streams with redundant, peer encoder components or determining whether inputted content streams can be considered to be matching.

As specified above, in one embodiment, the computing device 400 illustrated in FIG. 4 can be implemented as physical computing devices or virtualized computing devices in a computing network. In another embodiment, the computing device 400 may be implemented as logical components in a virtual computing network in which the functionality of the computing device 400 is implemented by an underlying substrate network of physical computing devices. In this embodiment, the computing device 400 may not be actually instantiated in the physical computing devices of the substrate network. Accordingly, reference to instantiation of a computing device 400 to carry out a desired function can correspond to a configuration of physical computing devices functioning as the computing device 400, instantiation of virtualized computing devices functioning as the computing device or instantiation of logical components in a virtualized network. In each of these examples, the creation, configuration and implementation of the components and the interactions described herein would vary according to the specific instantiation of the computing device 400. Thus, aspects of the present application should not be limited to interpretation requiring a physical, virtual or logical embodiment unless specifically indicated as such.

Figure 5:
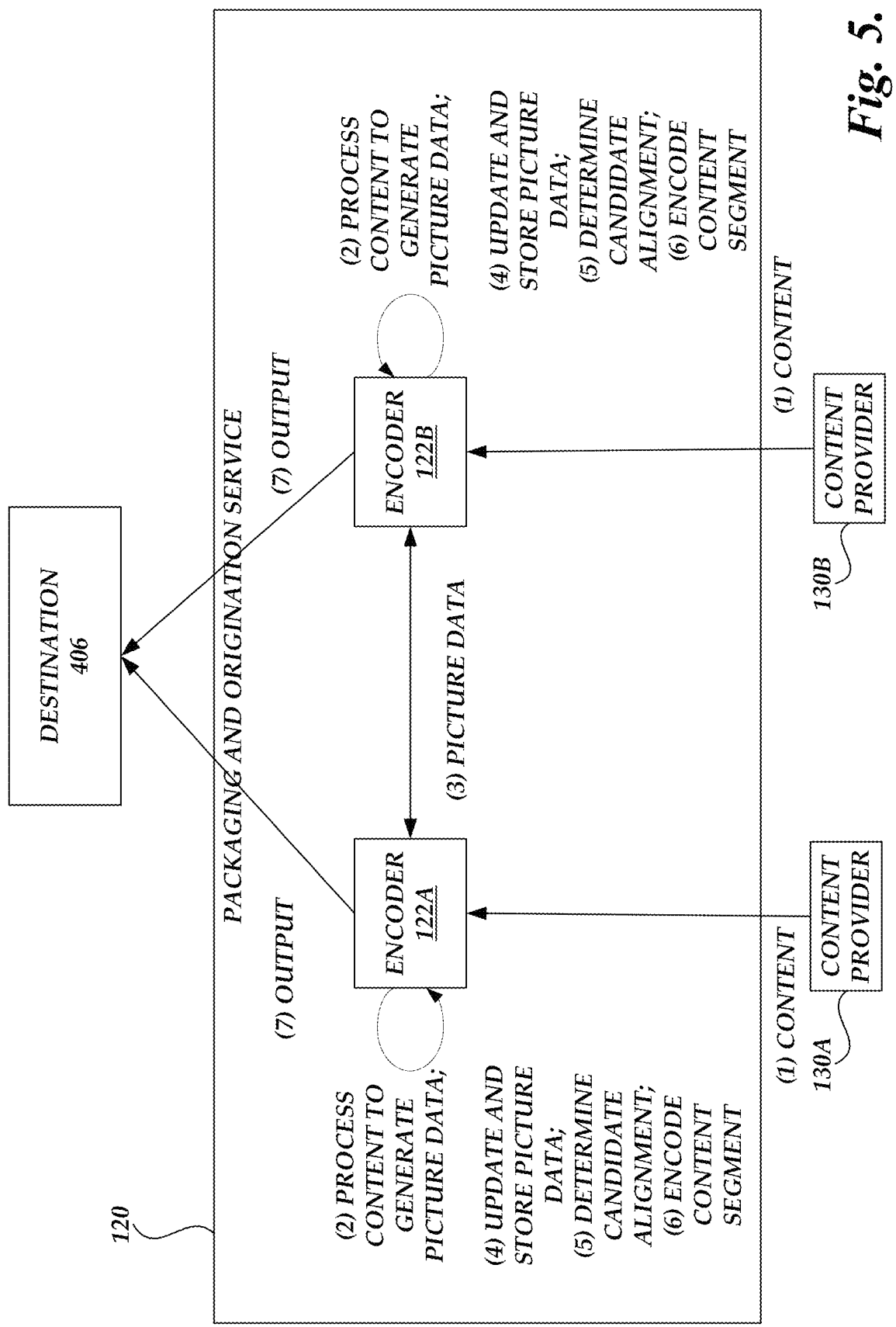
FIG. 5 is a block diagram of the content delivery environment of FIG. 1 illustrating the interaction in synchronizing encoder outputs utilizing exchanged picture data in accordance with some embodiments.

Turning now to FIG. 5, an illustrative interaction for the coordination of a plurality of encoder components 122 will be described. For purposes of illustration, FIG. 5 illustrates interaction between two encoder components 122A, 122B of the video packaging and origination service 120, two or more content providers 130A, 103B and a destination 406. The destination 406 will be generally used to reference any component that can receive and process synchronized, redundant content streams, such as a video packaging component of the video packaging and origination service 120, a content service provider 110, a user device 102, or additional components. Such interaction is representative in nature and could include a number of additional components or interactions. Additionally, although logically represented as components within the video packaging and origination service 120, the components may be implemented in different geographic areas and on physical computing devices. The interaction of FIG. 5 illustratively occurs after the video packaging and origination service 120 has received a requesting entity request for streaming content.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

At (1), encoder component 122A receives content to be encoded from content provider 130A and encoder component 122B receives content to be encode from content provider 130B. Illustratively, content provider 130A and content provider 130B are separate such that the input signal to encoder component 122A is different from the input signal to encoder component 122B. As will be described below, by having a different source and input signal, the encoder components 122A and 122B can have different timing information included in the transmission of content. In other embodiments, at least some portion of the source and input signal may not have any embedded timing information. Still further, although the illustrative interaction includes two content providers 130A and 130B, the encoder components 122A and 122B can receive input signals from a single or common set of content providers 130A (or a storage location). Additionally, although FIG. 5 is illustrated as interactions between two or more encoder components 122, one skilled in the relevant art will appreciate that any number of encoder components (e.g., greater than two) can also implement the illustrated interaction.

At (2), the encoder components 122A and 122B process the content to be encoded to generate picture data information. As described above, picture data information can be associated with a determination and identification of differences between individual images in the sequence of images forming the content to be encoded. Illustratively, the encoder components 122 can divide individual images according to blocks of pixels in which each pixel block is associated with a logical location defined along a horizontal and vertical axis (e.g., a location defined by a x and y axis). The picture data can be representative of the calculated difference between the same pixel block in successive images or frames of the content to be encoded. The differences can be illustratively determined in a value defined according to a mean average error, mean square error, or combination thereof, based on a comparison of one or more pixel attributes within the pixel block.

In some embodiments, as part of the generation of picture data, the encoder components 122 can process the content to be encoded to facilitate the generation of picture data. For example, the encoder components 122 can filter the sequence of images with a low pass filter to minimize high frequency information that will not likely form the basis of the picture data and can be removed from further processing. In another example, the encoder components 122 can modify the sequence images (or portion thereof) into a lower resolution to reduce the amount of information processed to generate the picture data. In still another example, the encoder components 122 can normalize individual pixel attribute information, such as selecting a single value or set of values representative of a pixel block. In yet another example, the encoders can select an attribute, such a hue, brightness, luminance, color, and the like that will be representative of the difference value that is calculated.

The encoder components 122 can select one or more blocks as representative of the differences in sequence of images. For example, the computing device can select a single pixel block having the highest calculated difference, at least a subset of pixel blocks exceeding a threshold difference amount, a fixed number of pixel blocks prioritized according to calculated difference and the like. The individual encoder components then store calculated picture data information at (3).

At (4), the encoder components 122 and then transmit picture data information to other encoder components associated with a particular redundant transmission (e.g., two or more encoder components). The encoder components 122A and 122B can utilize traditional networking or custom protocols to exchange information. Additionally, individual encoder components can be configured to observe a time out window that defines the amount of time an encoder component will wait to receive other picture data information from peer encoder components.

At (5), individual encoder components 122 associated with a redundant transmission then process the received and calculated picture data to determine an alignment for synchronized transmission of encoded data or output locking. Illustratively, the picture data can generally represent a pattern in the sequence of images forming the content to be encoded. The picture data does not require or rely on a detailed image analysis of any particular image in the sequence. Accordingly, by identifying the greatest amount of differences between frames, the individual encoder components can utilize a sliding window that attempts to align the sequence of identified differences.

By way of illustrative example, individual encoder components 122 can create a sliding window in which the smallest difference or error between the sequence patterns is indicative of a best alignment. The window illustratively captures the number of samples or alignment possibilities that can be considered targets. The window can be defined in terms of the maximum latency in the redundant content streams. The difference/error can be calculated as window error in the form of a mean average error or mean squared error.

In addition to identifying an alignment in the sliding window, the encoder components 122 can associate a confidence value with identified alignment candidates. In one example, the confidence value can be reflective of the difference from the lowest calculated error and the next lowest calculated error. If the difference exceeds a threshold, the encoder components 122 can associate a higher confidence value, such as representative of a category (e.g., "high," "medium" or "low") or as a numerical value. If the difference does not exceed a threshold, the encoder components 122 can associate a lower confidence value or otherwise indicate that the determined alignment may not be sufficiently different from other target alignments. In one example, the confidence value can be reflective of the difference from the lowest calculated error and the next lowest calculated error. In another example, the confidence value can be reflective of a comparison of the lowest calculated error and one or more thresholds. The confidence value may be reflective on whether the lowest calculated error exceeds a threshold or as to which threshold is exceeded (e.g., a "high" confidence value is reflective of exceeding a higher threshold). In yet another example, the confidence value may be reflective of the calculated difference value (normalized or absolute). Other examples may also apply.

Still further, in other embodiments, the encoder components 122 can repeat the determination of the alignment to ensure that that same candidate alignment is selected. Additionally, the encoder components 122 can keep state information related to previous alignment decisions. Accordingly, the encoder components 122 may defer a decision to change an alignment until multiple iterations of the alignment decision for successive segments has been achieved.

At (6), the encoding components 122A and 122B encode the content according to one or more encoding profiles (e.g., combinations of encoding bitrate and format) in accordance with the selected alignment information. In some situations, if the determined alignment information is consistent with previous alignment information (or synchronization information) or if the confidence value does not meet a threshold, the encoder components 122A and 122B may not require any adjustment or modification to the encoding process. The encoder components 122A and 122B can additional utilize the alignment information to form meta-data that is utilized by a destination to process redundantly received encoded content streams. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Accordingly, at (7), encoder 122A and encoder 122B transmit the encoded segment, including possible meta-data, to destination 406. As referenced previously, destination 406 generally references any component that can receive and process synchronized, redundant content streams, such as a video packaging component of the video packaging and origination service 120, a content service provider 110, a user device 102, or additional components. While illustrated as a singular components, in some embodiments, the destination 406 can be representative of two or more components that received at least some portion of a redundantly transmitted encoded segments. With reference to the previous discussion, FIG. 5 illustrates how the destination can receive redundant, encoded segment from two or more available redundant encoded streams.

Figure 6:
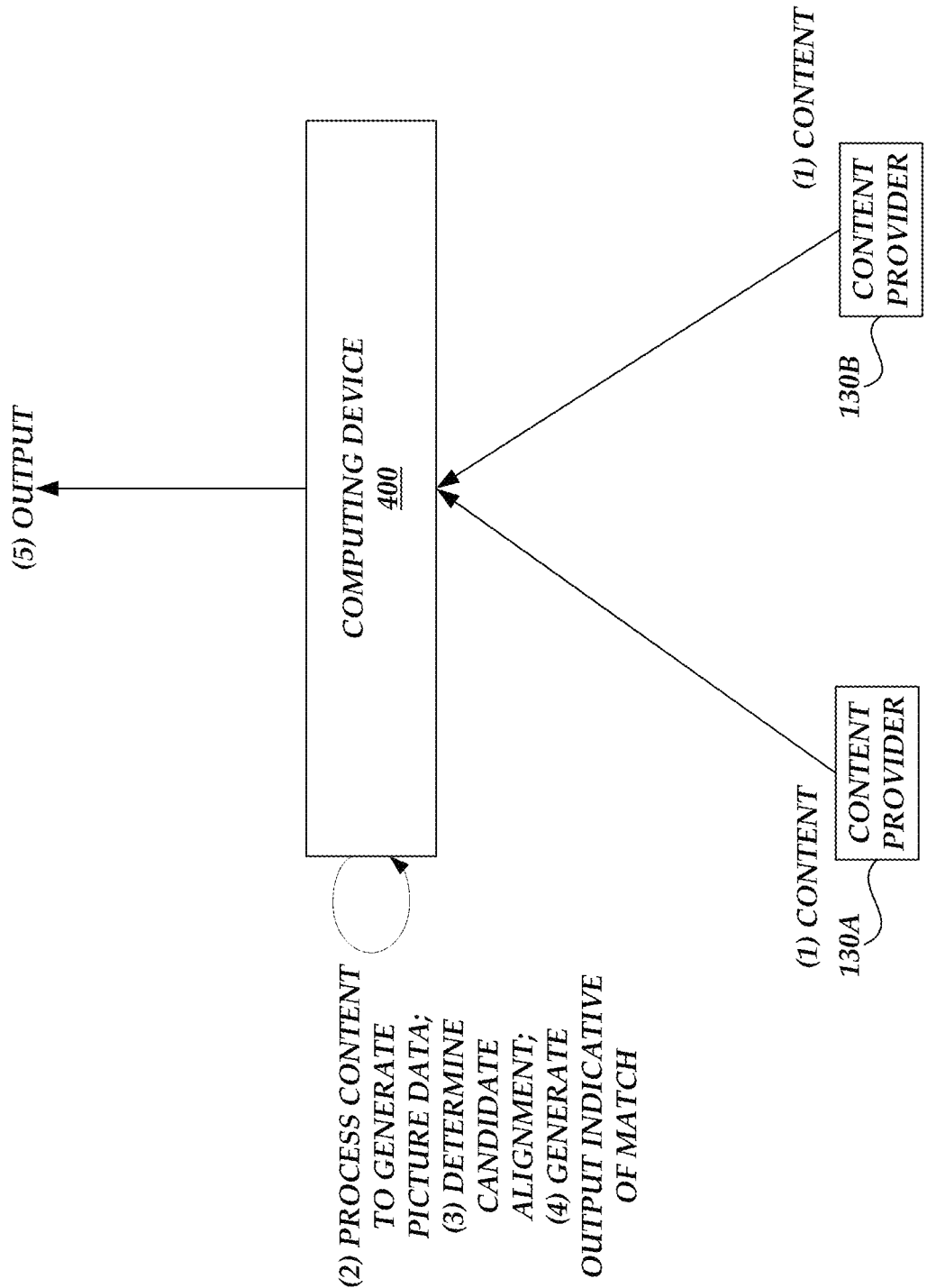
FIG. 6 is a block diagram of the content delivery environment of FIG. 1 illustrating the processing of content data utilizing picture data in accordance with some embodiments.

Turning now to FIG. 6, an illustrative interaction for the processing of multiple streams will be described. For purposes of illustration, FIG. 6 illustrates interaction between a computing device 400 and two or more content providers 130A, 103B. Such interaction is representative in nature and could include a number of additional components or interactions. The interaction of FIG. 6 illustratively occurs after the computing device 400 has received a request to identify matching content streams or otherwise determine whether content streams can match. Accordingly, the received content will be generally referred to as "content to be matched" for purposes of illustration.

At (1), computing device 400 receives content to be matched from content provider 130A and content provider 130B. Illustratively, content provider 130A and content provider 130B are separate such that the input signal can correspond to a content stream of known origin and one or more content streams that are attempted to be matched to the content stream of an unknown origin or otherwise from an unauthorized source. For example, assume one content stream may correspond to an archived version of a content stream that was authorized to be transmitted (e.g., the known origin) and at least one other content stream corresponds to a version of the content stream that was distributed in an unauthorized manner or from an unauthorized source. Still further, although the illustrative interaction includes two content providers 130A and 130B, the computing device 400 can receive input signals from a single or common set of content providers 130A (or a storage location).

At (2), the computing device 400 processes the content to be encoded to generate picture data information. As described above, picture data information can be associated with a determination and identification of differences between individual images in the sequence of images forming the content to be encoded. Illustratively, the computing device 400 can divide individual images according to blocks of pixels in which each pixel block is associated with a logical location defined along a horizontal and vertical axis (e.g., a location defined by a x and y axis). The picture data can be representative of the calculated difference between the same pixel block in successive images or frames of the content to be encoded. The differences can be illustratively determined in a value defined according to a mean average error, mean square error, or combination thereof, based on a comparison of one or more attributes associated with the pixel block. In certain embodiments, the selection of the pixel block(s) for purposes of determining similarity can be based, at least in part, of known locations of security information, watermarking information, or otherwise customized for the intended application of the processing routine.

In some embodiments, as part of the generation of picture data, the computing device 400 can process the content to be encoded to facilitate the generation of picture data. For example, the computing device 400 can filter the sequence of images with a low pass filter to minimize high frequency information that will not likely form the basis of the picture data and can be removed from further processing. In another example, the computing device 400 can modify the sequence images (or portion thereof) into a lower resolution to reduce the amount of information processed to generate the picture data. In still another example, the computing device 400 can normalize individual pixel attribute information, such as selecting a single value or set of values representative of a pixel block. In yet another example, the encoders can select an attribute, such a hue, brightness, luminance, color, and the like that will be representative of the difference value that is calculated.

The computing device 400 can select one or more blocks as representative of the differences in sequence of images. For example, the computing device can select a single pixel block having the highest calculated difference, at least a subset of pixel blocks exceeding a threshold difference amount, a fixed number of pixel blocks prioritized according to calculated difference and the like.

At (3), the computing device 400 processes the received and calculated picture data to determine an alignment for synchronized transmission of encoded data. Illustratively, the picture data can generally represent a pattern in the sequence of images forming the content to be encoded. The picture data does not require or rely on a detailed image analysis of any particular image in the sequence. Accordingly, by identifying the greatest amount of differences between frames, the individual encoder components can utilize a sliding window that attempts to align the sequence of identified differences.

Similar to the description above, the computing device 400 can create a sliding window in which the smallest difference or error between the sequence patterns is indicative of a best alignment. The window illustratively captures the number of samples or alignment possibilities that can be considered targets. The window can be defined in terms of the maximum latency in the redundant content streams. The difference/error can be calculated as window error in the form of a mean average error or mean squared error.

In addition to identifying an alignment in the sliding window, the computing device 400 can associate a confidence value with identified alignment candidates. In one example, the confidence value can be reflective of the difference from the lowest calculated error and the next lowest calculated error. If the difference exceeds a threshold, the computing device 400 can associate a higher confidence value, such as representative of a category (e.g., "high," "medium" or "low") or as a numerical value. If the difference does not exceed a threshold, the computing device 400 can associate a lower confidence value or otherwise indicate that the determined alignment may not be sufficiently different from other target alignments. In one example, the confidence value can be reflective of the difference from the lowest calculated error and the next lowest calculated error. In another example, the confidence value can be reflective of a comparison of the lowest calculated error and one or more thresholds. The confidence value may be reflective on whether the lowest calculated error exceeds a threshold or as to which threshold is exceeded (e.g., a "high" confidence value is reflective of exceeding a higher threshold). In yet another example, the confidence value may be reflective of the calculated difference value (normalized or absolute). Other examples may also apply. Still further, in other embodiments, the computing device 400 can repeat the determination of the alignment to ensure that that same candidate alignment is selected.

At (4), the computing device 400 can generate an output indicative of the likelihood of a match of content streams or a characterization of similarity. Illustratively, the output can correspond to whether an alignment of the content streams was identified. Additionally, the output can be based on a determined confidence factor for the identified alignment. For example, a confidence value of "low" may indicate that a likelihood of a match is also low. In another example, the likelihood of match can be based on the calculated percentage of the confidence factor. The output can include a notification of the result, the suggested alignment, or a combination.

Figure 7:
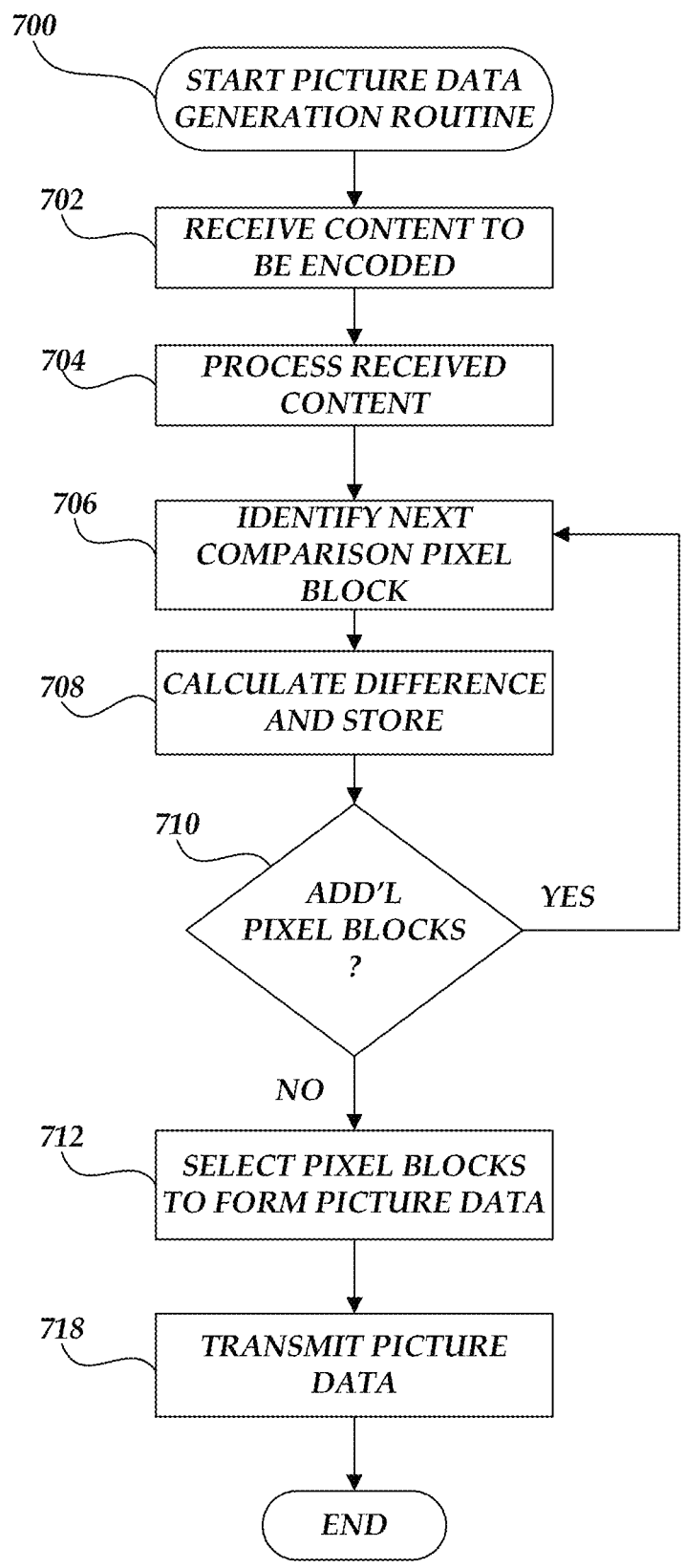
FIG. 7 is a flow diagram illustrative of a picture data generation routine implemented by a video packaging and origination system in accordance with some embodiments.

Turning now to FIG. 7, a routine 700 for implementing a picture data processing routine will be described. Illustratively, routine 700 will be described with regard to implementation by individual encoder components 122 or a computing device 400 as described herein. At block 702, an encoder component 122 receives content to be encoded from a content provider 130. As described above, in some embodiments, peer encoder components 122 receive from different content providers 130. As will be described below, by having a different source and input signal, the encoder components 122 can have different timing information included in the transmission of content. In other embodiments, at least some portion of the source and input signal may not have any embedded timing information. Still further, in some implementations, the encoder components 122 can receive input signals from the same content provider 103.

At block 704, the encoder component 122 can process the content to be encoded to facilitate the generation of picture data. For example, the encoder component 122 can filter the sequence of images with a low pass filter to minimize high frequency information that will not likely form the basis of the picture data and can be removed from further processing. In another example, the encoder component 122 can modify the sequence images (or portion thereof) into a lower resolution to reduce the amount of information processed to generate the picture data. In still another example, the encoder component 122 can normalize individual pixel attribute information, such as selecting a single value or set of values representative of a pixel block. In yet another example, the encoder components 122 can select an attribute, such a hue, brightness, luminance, color, and the like that will be representative of the difference value that is calculated. For example, each pixel block can be associated with an average luminance value of the individual pixels in the pixel block. In another example, each pixel block can be associated with a value representative of the number of pixels having a particular hue or color in combination with brightness (e.g., a product of the number of pixels having a red color value and the brightness for each such pixel).

After processing the content, the routine 700 enters into an iterative loop so that the encoder component 122 processes the content to be encoded to generate picture data information. As described above, picture data information can be associated with a determination and identification of differences between individual images in the sequence of images forming the content to be encoded. Illustratively, the encoder component 122 can divide individual images according to blocks of pixels in which each pixel block is associated with a logical location defined along a horizontal and vertical axis (e.g., a location defined by a x and y axis). The dimensions of the pixel blocks can vary based on processing resource availability and desired granularity in the routine 800.

At block 706, the encoder component 122 selects a next pixel block for comparison. At block 708, the encoder data calculates differences between the selected next pixel block with pixel blocks in successive images or frames of the content to be encoded. The differences can be illustratively determined as a value defined according to a mean average error, mean square error, or combination thereof, based on a comparison of the selected one or more pixel attributes within the pixel block. For example, if the selected pixel attribute corresponds to values representative of a luminance attribute associated with the pixel block (e.g., a single value or set of values), the determination of difference can correspond to the difference of the values representative of luminance between two successive pixel blocks. At decision block 710, a determination is made whether additional pixel blocks exist in the sequence of images. If so, the routine 700 returns to block 706 to select the next pixel block to process.

Alternatively, once all the pixel blocks have been processed and differences calculated, at block 712, the encoder component 122 can select one or more blocks as representative of the differences in sequence of images. For example, the encoder component 122 can select a single pixel block having the highest calculated difference between successive images, at least a subset of pixel blocks exceeding a threshold difference amount, a fixed number of pixel blocks prioritized according to calculated difference and the like. At block 714, then transmits transmit picture data information to other encoder component associated with a particular redundant transmission (e.g., two or more encoder components). The encoder components 122 can utilize traditional networking or custom protocols to exchange information. Additionally, individual encoder components can be configured to observe a time out window that defines the amount of time an encoder component 122 will wait to receive other picture data information from peer encoder components. Routine 700 terminates at block 716. Once routine 700 terminates, the encoder components 122 can illustratively utilize routine 800 to process exchanged picture data as described herein.

Figure 8:
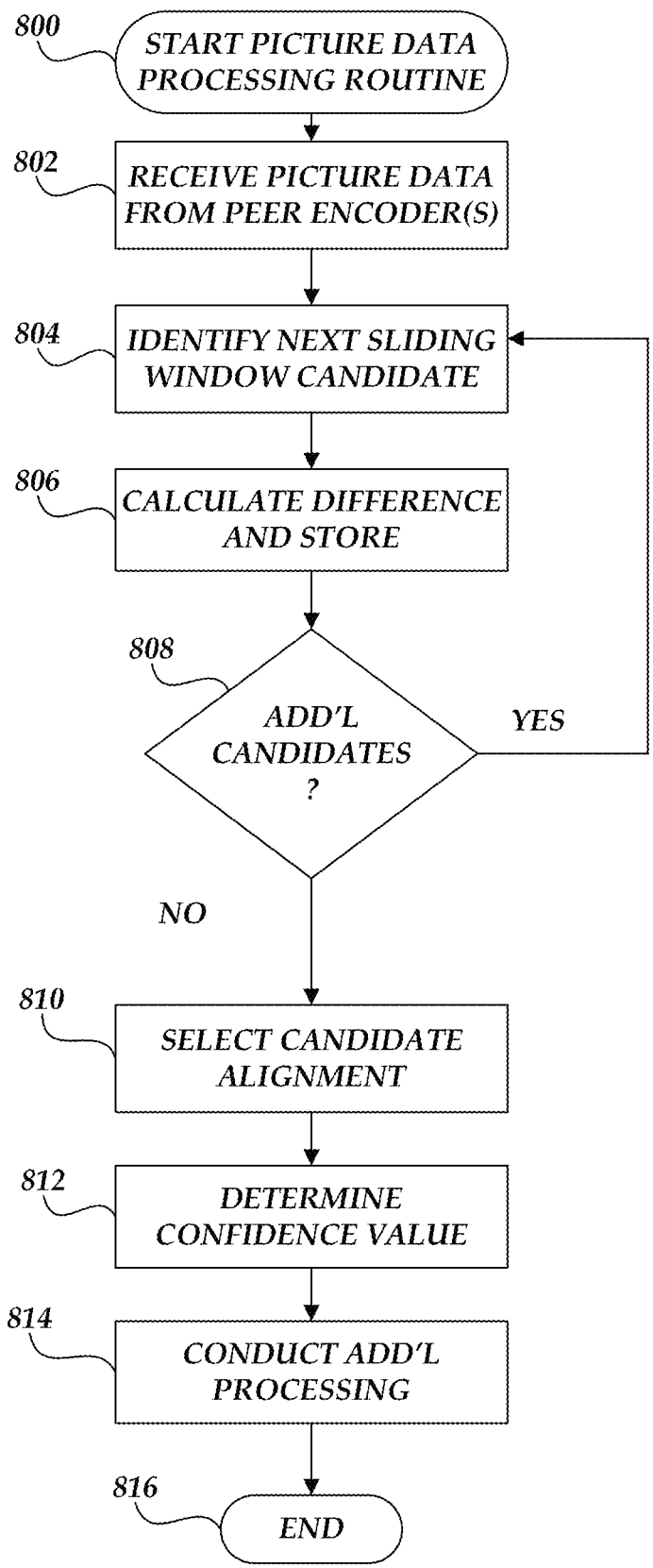
FIG. 8 is a flow diagram illustrative of a picture data generation routine implemented by a video packaging and origination system in accordance with some embodiments.

Turning now to FIG. 8, a routine 800 for implementing a picture data processing routine will be described. Illustratively, routine 800 will be described with regard to implementation by individual encoder components 122 or a computing device 400 as described herein. At block 802, an encoder component 122 receives picture data from peer encoder components 122. Illustratively, each peer encoder component 122 can execute routine 700 (FIG. 7) or something similar to generate respective picture data.

Once the picture data has been exchanged, each of the encoder components 122 associated with a redundant transmission then process the received and calculated picture data to determine an alignment for synchronized transmission of encoded data. Illustratively, the picture data can generally represent a pattern in the sequence of images forming the content to be encoded. The picture data does not require or rely on a detailed image analysis of any particular image in the sequence. Accordingly, by patterns of the greatest amount of differences between frames, the individual encoder components can utilize a sliding window of sequences that attempts to best align the sequence of identified differences.

Routine 800 then begins an iterative loop to identify a candidate alignment from the exchange picture data. Accordingly, individual encoder components 122 can create a sliding window in which the smallest difference or error between the sequence patterns is indicative of a best alignment. The window illustratively captures the number of samples or alignment possibilities that can be considered targets. The window can be defined in terms of the maximum latency in the redundant content streams. At block 804, the encoder component 122 identifies a next candidate in the defined window. At block 806, the encoder component determines between the received picture data (e.g., a sequence of differences) and the previously calculated picture data. The difference/error between the two sequences can be calculated as window error in the form of a mean average error or mean squared error. At decision block 808, a determination is made whether additional candidate blocks exist in the window. If so, the routine 800 returns to block 804 to select the next candidate alignment to process.

Alternatively, once all the candidate alignments have been processed and differences calculated, at block 810, the encoder component identifies a final candidate alignment based on the determined difference. For example, the final candidate alignment may be selected on the basis of the lowest calculated difference. At block 812, in addition to identifying an alignment in the sliding window, the encoder component can associate a confidence value with identified alignment candidates. In one example, the confidence value can be reflective of the difference from the lowest calculated error and the next lowest calculated error. If the difference exceeds a threshold, the encoder components 122 can associate a higher confidence value, such as representative of a category (e.g., "high," "medium" or "low") or as a numerical value. If the difference does not exceed a threshold, the encoder component 122 can associate a lower confidence value or otherwise indicate that the determined alignment may not be sufficiently different from other target alignments. In one example, the confidence value can be reflective of the difference from the lowest calculated error and the next lowest calculated error. In another example, the confidence value can be reflective of a comparison of the lowest calculated error and one or more thresholds. The confidence value may be reflective on whether the lowest calculated error exceeds a threshold or as to which threshold is exceeded (e.g., a "high" confidence value is reflective of exceeding a higher threshold). In yet another example, the confidence value may be reflective of the calculated difference value (normalized or absolute). Other examples may also apply.

At block 814, the encoder components 122 can repeat the determination of the alignment to ensure that that same candidate alignment is selected. Additionally, the encoder component 122 can keep state information related to previous alignment decisions. Accordingly, the encoder component 122 may defer a decision to change an alignment until multiple iterations of the alignment decision for successive segments has been achieved. Routine 800 terminates at block 816 in which the encoder component 122 can utilize the selected alignment information as part of the encoding process or transmit the calculated alignment to a destination.

As described above, the encoding components 122 encode the content according to one or more encoding profiles (e.g., combinations of encoding bitrate and format) in accordance with the selected alignment information. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. The encoder components 122 and destinations 406 can utilize the alignment information to generate and process redundant encoded content streams in which the alignment information forms, at least in part, synchronization information between two or more content streams.

Figure 9:
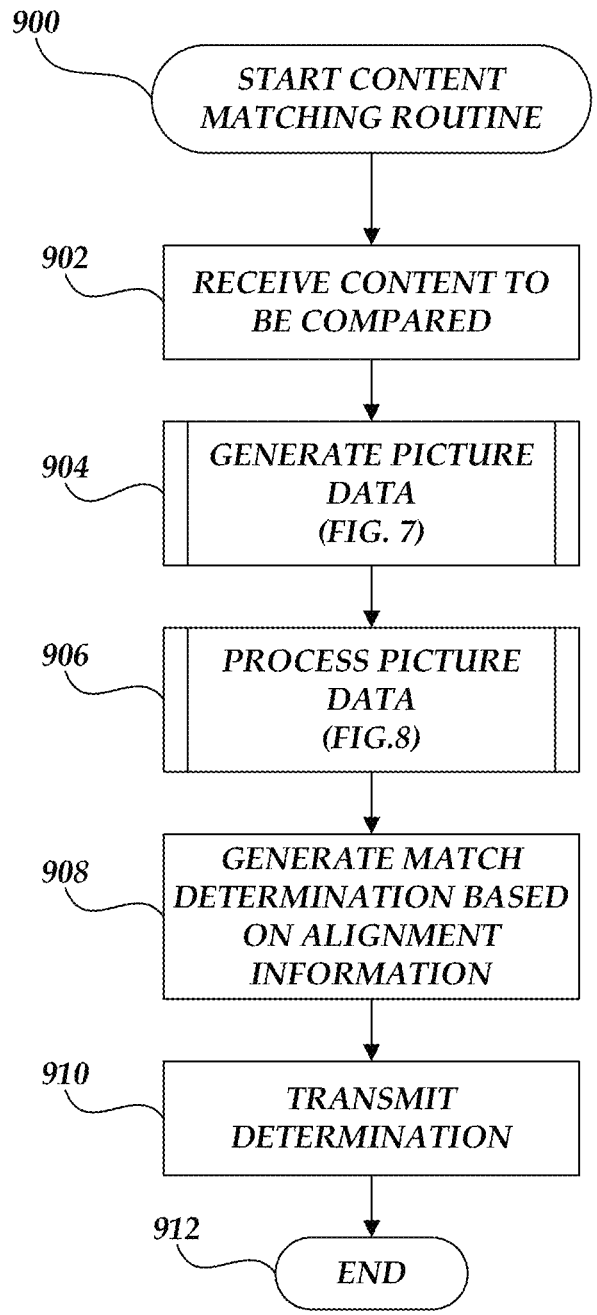
FIG. 9 is a flow diagram illustrative of an encoder coordination routine implemented by a computing device in accordance with some embodiments.

Turning now to FIG. 9, a routine 900 for implementing a content matching processing routine will be described. Illustratively, routine 900 will be described with regard to implementation by a computing device 400 as described herein. At block 902, the computing device 400 receives content streams from a content provider 130. Illustratively, content provider 130A and content provider 130B are separate such that the input signal can correspond to a content stream of known origin and one or more content streams that are attempted to be matched to the content stream of known origin. Still further, although the illustrative interaction includes two content providers 130A and 130B, the computing device 400 can receive input signals from a single or common set of content providers 130A (or a storage location).

At block 904, the computing device 400 can process the content to be encoded to generate picture data. Illustratively, the computing device 400 can implement routine 700 (with some modifications) to generate picture data. In some embodiments, the encoder components 122 or other device may have previously generated the picture data to be processed and block 902 and 904 can be combined and modified accordingly. At block 906, the computing device can then process the generated picture data to generate a proposed candidate alignment and confidence value. Illustratively, the computing device 400 can implement routine 800 (with some modifications) to process the generated picture data.

At block 908, the computing device generates an output based on the determined alignment. Illustratively, the output can correspond to whether an alignment of the content streams was identified. Additionally, the output can be based on a determined confidence factor for the identified alignment. For example, a confidence value of "low" may indicate that a likelihood of a match is also low. In another example, the likelihood of match can be based on the calculated percentage of the confidence factor. The output can include a notification of the result, the suggested alignment, or a combination. At block 910, the computing device 400 transmits the output. Routine 900 terminates at block 912.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method to process a plurality of content streams, the computer-implemented method comprising:

generating a set of picture data associated with a plurality of content streams, wherein individual content streams corresponds to a sequence of images and wherein individual picture data is representative of a sequence of differences between attributes representative of a pixel block in successive images in at least a subset of the sequence of images in an individual content stream;

determining, using consecutive sets of images, a set of errors between the sequences of differences of the plurality of content streams, wherein an individual error is representative of a difference between two sequences of differences of the two corresponding individual content streams;

determining alignment candidates of the plurality of content streams based on the set of errors, wherein the alignment candidates correspond to individual content streams having a smallest error between the individual picture data of the set of picture data; and generating a characterization of similarity associated with the plurality of content streams based on the determined alignment candidates.

2. The computer-implemented method of claim 1, wherein representing the sequence of differences between attributes representative of a pixel block in successive images in the at least a subset of the sequences of images includes:

determining a set of blocks of pixels forming each individual image in a set of images;

identifying differences between blocks of pixels for respective images in the set of images; and selecting one or more blocks of pixels as representative of differences in the set of images.

3. The computer-implemented method of claim 2, wherein the set of blocks of pixels corresponds to logical locations along a vertical and horizontal axis and wherein identifying differences between the blocks of pixels for the respective images in the set of images includes identifying differences between the blocks of pixels having a common logical location.

4. The computer-implemented method of claim 3, wherein identifying differences between the blocks of pixels for the respective images in the set of images includes identifying at least one of a mean average error or mean square error between the blocks of pixels.

5. The computer-implemented method of claim 3, wherein the common logical location is associated with a location of watermarking images.

6. The computer-implemented method of claim 1, wherein generating the set of picture data associated with the plurality of content streams includes representing each sequence by an attribute of the sequence.

7. The computer-implemented method of claim 1, wherein generating the set of picture data associated with the plurality of content streams includes at least one of filtering at least a portion of the pixels forming individual sequences or reducing a resolution forming the individual sequences.

8. The computer-implemented method of claim 1, wherein determining the alignment candidates of the plurality of content streams based on the set of errors includes determining a minimal error based on comparison of a target window of sequence alignment.

9. The computer-implemented method of claim 8 further comprising associating a confidence value for the determined alignment candidates based on the minimal error determination.

10. The computer-implemented method of claim 9, wherein associating the confidence value includes:

comparing a largest minimal error with a next largest minimal error; and calculating the confidence value based, at least in part, on whether a difference between the largest minimal error and the next largest minimal error exceeds a threshold.

11. The computer-implemented method of claim 9, wherein generating the characterization of similarity associated with the plurality of content streams based on the determined alignment candidates includes associating the characterization of similarity based on a category of the confidence value.

12. The computer-implemented method of claim 8, wherein determining the minimal error based on comparison of the target window of sequence alignment includes determining at least one of a mean average error or mean squared error.

* * * * *